United States Patent
Sejvar

(10) Patent No.: US 9,466,399 B2
(45) Date of Patent: Oct. 11, 2016

(54) EXPANSION GAP RADIATION SHIELD

(75) Inventor: James Sejvar, Murrysville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1663 days.

(21) Appl. No.: 12/715,420

(22) Filed: Mar. 2, 2010

(65) Prior Publication Data

US 2010/0296618 A1    Nov. 25, 2010

Related U.S. Application Data

(60) Provisional application No. 61/180,211, filed on May 21, 2009.

(51) Int. Cl.
G21C 13/04    (2006.01)
G21F 1/02     (2006.01)
G21F 3/00     (2006.01)
G21C 19/18    (2006.01)

(52) U.S. Cl.
CPC ............... *G21F 1/023* (2013.01); *G21C 13/04* (2013.01); *G21C 19/18* (2013.01); *G21F 3/00* (2013.01); *Y02E 30/40* (2013.01)

(58) Field of Classification Search
USPC .............................. 376/277, 287, 293, 519.1
See application file for complete search history.

(56) References Cited

U.S. PATENT DOCUMENTS

| | | | |
|---|---|---|---|
| 3,497,421 A * | 2/1970 | Thome | 376/296 |
| 3,583,892 A | 6/1971 | Isaac | |
| 3,637,096 A | 1/1972 | Crate | |
| 4,069,766 A | 1/1978 | Bernstein | |
| 4,090,087 A | 5/1978 | Weissenfluh | |
| 4,608,495 A | 8/1986 | Jacobson | |
| 4,859,404 A | 8/1989 | Richard | |
| 4,892,684 A * | 1/1990 | Harp | 588/17 |
| 6,432,495 B1 | 8/2002 | Berrier et al. | |
| 7,211,814 B2 * | 5/2007 | Cadwalader et al. | 250/519.1 |
| 7,473,919 B2 | 1/2009 | Cadwalader et al. | |

FOREIGN PATENT DOCUMENTS

| | | |
|---|---|---|
| CN | 1044067 A | 7/1990 |
| CN | 1080771 A | 1/1994 |
| CN | 2532419 Y | 1/2003 |
| EP | 0 531 087 A1 | 3/1993 |
| JP | 9 230092 A | 9/1997 |
| JP | 11 142590 A | 5/1999 |
| JP | 11 231094 A | 8/1999 |
| SU | 1714377 | 10/1989 |
| SU | 1714377 A1 | 2/1992 |

OTHER PUBLICATIONS

In-Yong Kim, "Nuclear Power Reactor Technology Module 2 Fuel Storage and Handling System," KAERI Nuclear Training Center, pp. 1-15.

* cited by examiner

*Primary Examiner* — Sean P Burke
(74) *Attorney, Agent, or Firm* — Joseph C. Spadacene; Westinghouse Electric Company LLC

(57) ABSTRACT

An expansion gap radiation shield is formed from a flexible container housing a radiation shielding fluid, that is located within a variable gap in permanent shielding. The invention reduces radiation dose rates outside the gap when the radiation sources are located on the opposite side of the gap. The device accommodates varying gap sizes with no loss of shielding capability.

15 Claims, 4 Drawing Sheets

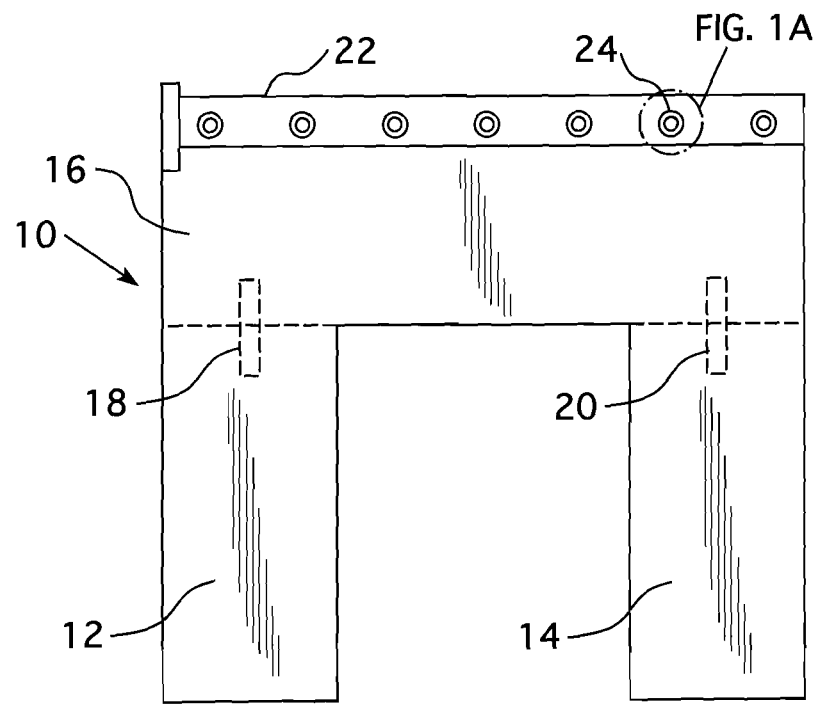
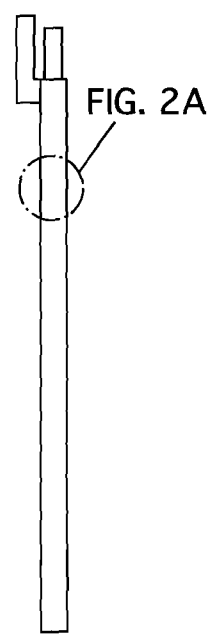
FIG. 1
FIG. 2
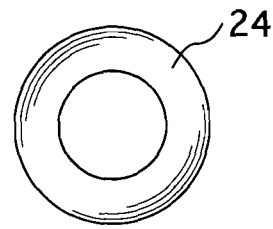
FIG. 1A
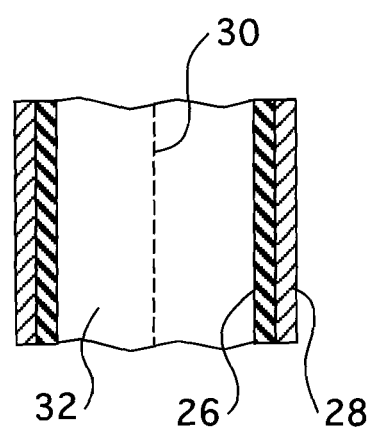
FIG. 2A

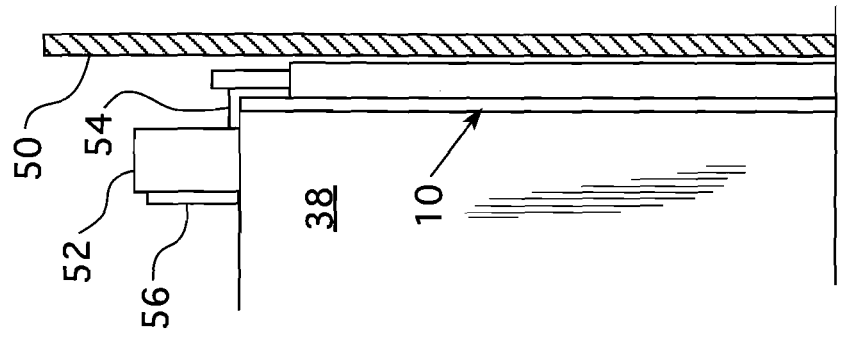
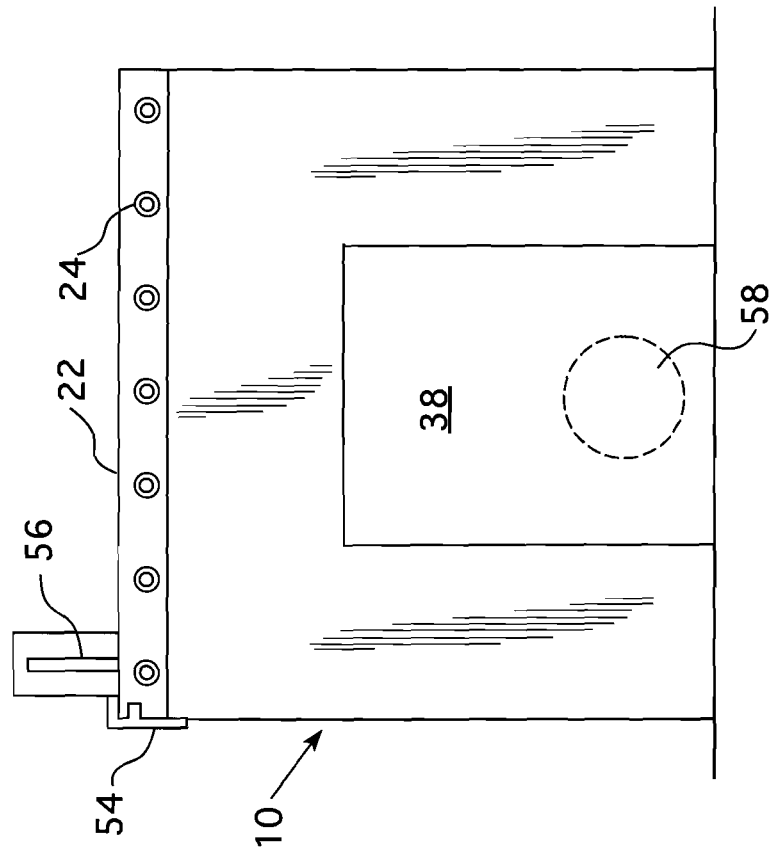

EXPANSION GAP RADIATION SHIELD

CROSS REFERENCE TO RELATED APPLICATIONS

This invention claims the priority of U.S. provisional application Ser. No. 61/180,211, entitled EXPANSION GAP RADIATION SHIELD, filed May 21, 2009.

BACKGROUND OF THE INVENTION

1. Field of the Invention

This invention pertains generally to radiation shields and more particularly to a flexible radiation shield that can fill an opening in a thermal expansion gap and accommodate the varying clearances within the gap with temperature without a loss of shielding integrity.

2. Description of the Related Art

In a typical nuclear power plant, most notably those that employ pressurized water reactors, the reactor pressure vessel utilized to generate heat, as well as other components such as steam generators, pumps, pressurizers, and associated piping, are housed in a containment building. Typically, a containment building may be made of concrete, stainless steel, a combination of the two, or other appropriate material. The containment building defines a refueling cavity and completely encloses the entire reactor and reactor coolant system and ensures that an acceptable limit for release of radioactive materials to the surrounding/local environment would not be exceeded, even in the unlikely occurrence of a gross failure of the reactor coolant system. All operations and procedures associated with the functioning of the reactor vessel and the reactor coolant system are performed within the containment building.

Typically, a refueling cavity is provided for in the containment. The refueling cavity is generally a split level area, wherein the upper level contains a reactor cavity and the lower level consists of a fuel transfer canal. The reactor vessel is housed within the reactor cavity which is also a reinforced concrete structure. When filled with water for refueling, it forms a pool above the reactor within the refueling cavity. The refueling cavity is filled to a depth that limits radiation at the surface of the water, usually up to an operating deck from which maintenance procedures are conducted, to acceptable levels. Typically, the water is in the form of borated water, which helps to minimize radiation exposure levels. The water provides an effective and transparent radiation shield for personnel on the operating deck, as well as a reliable medium for the removal of decay heat from the reactor vessel. During refueling, spent or depleted fuel is removed from the reactor core, transferred under water, and placed in a refueling transfer system by the plant's refueling machine; and new or fresh fuel is similarly transferred from a fuel transfer building outside of the containment through a fuel transfer tube within the fuel transfer canal, for loading in the reactor. After the refueling operation is complete the water is drained from the refueling cavity and the refueling canal and the fuel transfer tube is sealed within the containment before the reactor is started up.

During refueling and maintenance operations every effort is made to shield personnel from radiation exposure. During shield design activities for a new generation of nuclear plants, a location was identified that was difficult to shield by conventional methods. This area was a two-inch wide expansion gap between the reactor containment and the concrete shield around the fuel transfer tube where it extends from the fuel handling building through the containment. This gap can vary depending on temperature conditions inside and outside the containment; requiring a shield that can accommodate this variability. This is an important issue, since overexposure of plant workers have occurred in the past due to such gaps in shielding.

Gaps in or between radiation shields can result in highly localized radiation fields outside the gap that may not be readily detected by radiation protection personnel. This problem is exacerbated by situations in which the radiation source that is being shielded is not fixed and is intermittently introduced behind the shield wall. An example of this is the expansion gap around the fuel transfer tube in a nuclear power plant. Suitable space must be maintained between the outside steel containment shell and concrete shield material that is placed around the fuel transfer tube. A gap that is typically two inches wide is required to accommodate thermal expansion of the containment vessel. Also, for a concrete containment with a steel liner, seismic gaps that are typically two inches in width are provided between the containment wall and/or steel liner and the transfer tube shielding. When a spent fuel assembly is transferred from the containment to the spent fuel pool within the fuel handling building, through the transfer tube; the dose rates outside the gap can result in potentially lethal doses of radiation to personnel. Several instances of worker overexposure have occurred in the past resulting in nuclear regulatory commission instructions to licensees that requires strict control of access and posting (for example, see Nuclear Regulatory Commission Office of Inspection and Enforcement Bulletin No. 78-08, "Radiation Levels From Fuel Element Transfer Tubes," Jun. 12, 1978).

Various "shadow shield" type shielding arrangements using lead or steel have been considered, but have been rejected due to the cost and difficulties in their design and installation.

Accordingly, a new means of shielding is desired that can affectively protect personnel while accommodating the variations in expansion gaps.

Furthermore, such a method of shielding is desired that will last over extended outages and preferably for the life of the plant.

SUMMARY OF THE INVENTION

This invention provides an expansion gap radiation shield that is a flexible receptacle that contains a shielding fluid that is located within an expansion gap. The device reduces radiation dose rates outside the gap when radiation sources are located on the opposite side of the gap, and accommodates varying gap sizes with no loss of shielding capability. More particularly, the radiation shield of this invention includes a hollow flexible outer bladder having an interior reservoir for containing a fluid that attenuates neutron and gamma rays emitted from a fuel assembly. The hollow flexible outer bladder is housed at least partially within a flexible gap between substantially rigid radiation shielding material, wherein the hollow flexible outer bladder substantially fills an opening in the gap. A fluid inlet in the hollow flexible outer bladder communicates the interior reservoir with the exterior of the flexible outer bladder for filling the interior reservoir with at least some of the fluid.

Preferably, a make-up tank is included that is in fluid communication with the reservoir within the hollow flexible outer bladder for controlling the volume of fluid within the reservoir. Desirably, the make-up tank is in fluid communication with the fluid inlet and is open to the atmosphere.

Preferably, the make-up tank is hermetically sealed to the reservoir and forms an overflow tank for changes in volume of the reservoir. Desirably, means are included, such as a site gage, for indicating a level of a fluid in the make-up tank. The means may also indicate a change of level of the volume of fluid in the reservoir.

In another embodiment, the hollow flexible outer bladder comprises a plurality of flexible outer bladders that are interconnected to hermetically communicate the interior reservoirs thereof. Desirably, at least some of the plurality of flexible outer bladders are disconnectible from others of the plurality of flexible outer bladders without damaging a coupling between them.

In still another embodiment, the hollow flexible outer bladder is formed from two plies with an inner ply chosen from a material having properties that will contain the fluid over a plurality of outages and an outer ply that is puncture and abrasion resistant. Preferably, the inner ply is formed from a rubber or rubberized material and the outer ply is formed from a rubberized Kevlar ® material.

In still another embodiment, the hollow flexible outer bladder includes an anti-sag baffle. Desirably, the anti-sag baffle comprises a relatively inflexible material such as a mesh supporting a shape of at least four sides of the outer bladder.

The invention also contemplates a power generating facility having a nuclear island enclosed within a containment. The nuclear island includes a fuel transfer tube extending through the nuclear containment for transporting fuel assemblies and other irradiated components from the interior of the nuclear containment to the exterior thereof. A solid radiation shield surrounds at least a portion of the fuel transfer tube and an expansion gap exists between the solid radiation shield and the nuclear containment for accommodating differentials in thermal expansion of the solid radiation shield and the nuclear containment. The power generating facility further comprises a flexible radiation shield extending between and at least partially within the expansion gap. In a preferred embodiment, the flexible radiation shield includes the hollow outer bladder and fluid inlet previously described.

BRIEF DESCRIPTION OF THE DRAWINGS

A further understanding of the invention can be gained from the following description of the preferred embodiments when read in conjunction with the accompanying drawings in which:

FIG. 1 is an elevational view of the expansion gap radiation shield of this invention suspended from a support bracket which is attached to the concrete shielding surrounding a fuel transfer tube;

FIG. 1A is an enlarged section of FIG. 1 in the area of the support bracket illustrating the grommets employed to support the flexible shield of this invention on the support bracket;

FIG. 2 is a side sectional view of FIG. 1;

FIG. 2A is an enlarged section of a portion of FIG. 2 illustrating the two-ply walls of the hollow flexible outer bladder of this invention with an optional anti-sag baffle supported therein;

FIG. 7 is the elevational view illustrated in FIG. 1 showing the placement of the make-up/expansion tank and site gage relative to the hollow flexible outer bladder of this invention and the fuel transfer tube placement within the surrounding outer concrete shield; and FIG. 8 is a side view of FIG. 7 which further shows the placement of the hollow flexible outer bladder of this invention between the transfer tube concrete shield and the containment wall.

DESCRIPTION OF THE PREFERRED EMBODIMENTS

Figure 3:
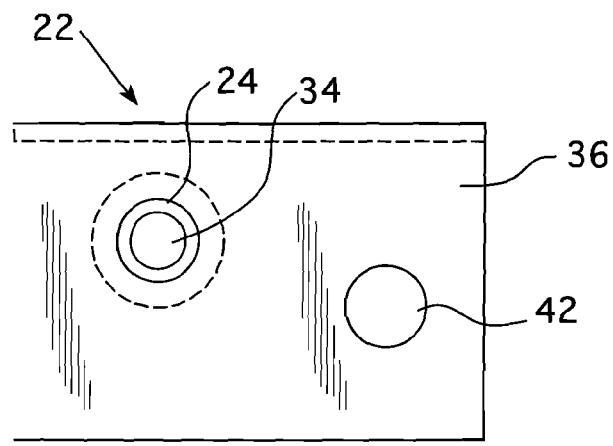
FIG. 3 is a bottom view of a portion of the support bracket employed by this invention showing the relation between the shield support bolts and the anchor bolts employed to affix the support bracket to the fuel transfer tube concrete radiation shield.
Figure 4:
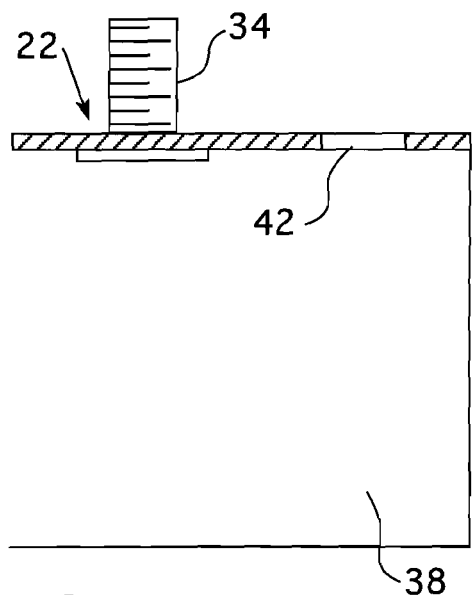
FIG. 4 is a side view of FIG. 3 partially in section.
Figure 5:
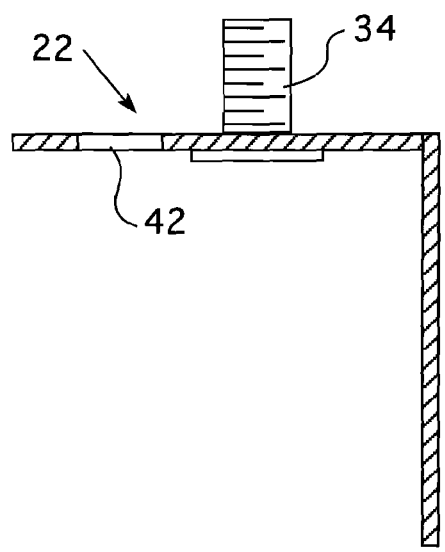
FIG. 5 is a side view of the support bracket of this invention, partially in section, which shows the angle support bracket as it extends around the corner of the fuel transfer tube concrete shield between the concrete shield and the containment.

In refueling a nuclear reactor, the radioactive fuel assemblies must be removed from the reactor core and stored for an extended period of time in a spent fuel pool. In order to avoid the hazards due to radiation, the nuclear reactor core is flooded with water to a substantial depth above the top of the core with the fuel elements removed under water. Since these fuel elements are highly radioactive and still produce heat known as decay heat for a period of several months, they cannot be immediately removed from the plant but must be stored, preferably under water, which provides radiation protection and the necessary cooling.

When these spent fuel elements have sufficiently decayed, they may be removed and shipped for reprocessing, or stored at the plant in the spent fuel pool or in dry storage casks. Since the nuclear reactor will be back in operation at the time the spent fuel is removed, it is preferable that the spent fuel pool be located outside of the reactor containment. Since the reactor containment is designed to withstand relatively high pressures and to provide radiation shielding, large openings in this containment vessel are cumbersome and expensive. The elongated fuel elements are therefore longitudinally passed through openings in the reactor containment to a fuel handling building.

One approach is to locate the spent fuel pool at an elevation well below the reactor so that the fuel elements may be lowered downwardly into the spent fuel pool. This, however, requires extensive excavation due to the lower elevation of the pool and increases the amount of flooding required in order to effect an appropriate fuel transfer between the reactor refueling pool above the reactor cavity and the spent fuel pool in the adjacent fuel handling building outside the containment.

Another approach generally used is to locate the spent fuel pool in the fuel handling building outside the containment at an elevation approximately equal to the reactor refueling pool. A transfer tube extends between the reactor refueling pool, through the containment wall, to the spent fuel pool in the fuel handling building. A transfer tube joins the two pools and this transfer tube is capable of being valved off by means of gate valves to isolate the spent fuel pool from the interior of the containment when the water in the containment is drained in preparation for starting up the reactor. Transfer of a fuel assembly between the two pools requires that the fuel assembly be removed from the reactor, be placed on a fuel carrier, rotated to a horizontal position and moved through the fuel transfer tube. After the transfer of the fuel assemblies is complete, the gate valves are closed, the water in the containment is drained and the fuel transfer tube is sealed off on the containment side by a removable hatch.

As previously mentioned, during shield design activities for a new generation of nuclear plants, a location was identified that was difficult to shield by conventional methods. This area was a two-inch (5.08 cm) wide expansion gap between the reactor containment and the concrete shield around the fuel transfer tube that is intended to shield radiation emitted from the spent fuel assemblies as they transfer through the tube. This gap can vary depending on the temperature conditions inside and outside the containment; requiring a shield that can accommodate this variability. This was recognized as an important issue since overexposure of plant workers as a result of such a gap in radiation shielding has occurred in the past. Gaps in or between radiation shields can result in highly localized radiation fields outside the gap that may not be readily detected by radiation protection personnel. This problem is exacerbated by situations in which a radiation source that is being shielded is not fixed and is intermittently introduced behind the shield wall as is the case with the transfer of spent fuel. The gap that is typically two inches (5.08 cm) wide is required to accommodate thermal expansion of the containment vessel. Also, for a concrete containment with a steel liner, seismic gaps that are typically two inches (5.08 cm) in width are provided between the containment wall and/or steel liner and the concrete transfer tube shielding. When a spent fuel assembly is transferred from the containment to the spent fuel pool through the transfer tube, the dose rates outside the gap can result in potentially lethal doses of radiation to personnel.

This invention addresses the issue of shielding such variable gaps by providing a bladder-type radiation shield and fills the air gap with a suitable fluid that will provide an acceptable degree of radiation shielding. The shield conforms to the existing gap width as it may vary, such that shield integrity is always maintained. The shield system of this invention is totally passive and a sight-gauge on a local make-up/expansion tank provides an immediate indication to personnel in the area of a possible disruption of shield integrity. A shield arrangement, in accordance with this invention, for a one-piece expansion gap radiation shield for a typical nuclear plant spent fuel transfer tube is shown in FIG. 1 and described below.

As illustrated in FIG. 1, a bladder-type radiation shield 10 in accordance with this invention is fabricated to fit the geometry of a gap that it is intended to shield; in this case, the space between the square concrete radiation shield that surrounds a spent fuel transfer tube and the opening in a nuclear containment through which the spent fuel transfer tube radiation shield extends. Alternatively, as indicated by the dotted lines in FIG. 1, the shield can be fabricated in more simplified geometries and interconnected. For example, the shield 10 can be fabricated in the three rectangular configurations 12, 14 and 16 and positioned in a "post and lintel" configuration with interconnections made by way of fluid communication ports 18 and 20. In FIG. 1, the interface between the posts 12 and 14 and the lintel 16 and the interconnections 18 and 20 therebetween are shown in phantom, in dotted form, for the purpose of illustration. Preferably, the interconnections 18 and 20 form hermetic seals that will contain the shielding fluid 32 confined within the bladder sections while permitting fluid communication therebetween. The shield 10 is supported by a suitable support frame 22 at the grommets 24 shown in more detail in FIG. 1A, that are supplied with the bladder 16. The shield 10 is fabricated employing a two-ply bladder system shown in FIG. 2A, which is an enlargement of a portion of the side view of FIG. 1 shown in FIG. 2. The two-ply bladder system comprises an inner bladder of preferably a rubberized material 26 for long-term containment of a shielding fluid and an outer bladder 28 for puncture and abrasion resistance. For example, the outer bladder would utilize a rubberized Kevlar® material (a puncture resistant fiber material), such as Aero Tech Laboratories Inc. ATL-797-B or equivalent. If additional stability is required for a particular geometry or circumstance, an appropriate anti-sag baffle 30 made of a relative rigid material such as a mesh material can be included in the fabrication process. The baffle 30 would consist of a relatively inflexible material connected to at least four sides of the bladder or a fabric mesh that would be attached to the inner bladder of the shield 10.

Figure 6:
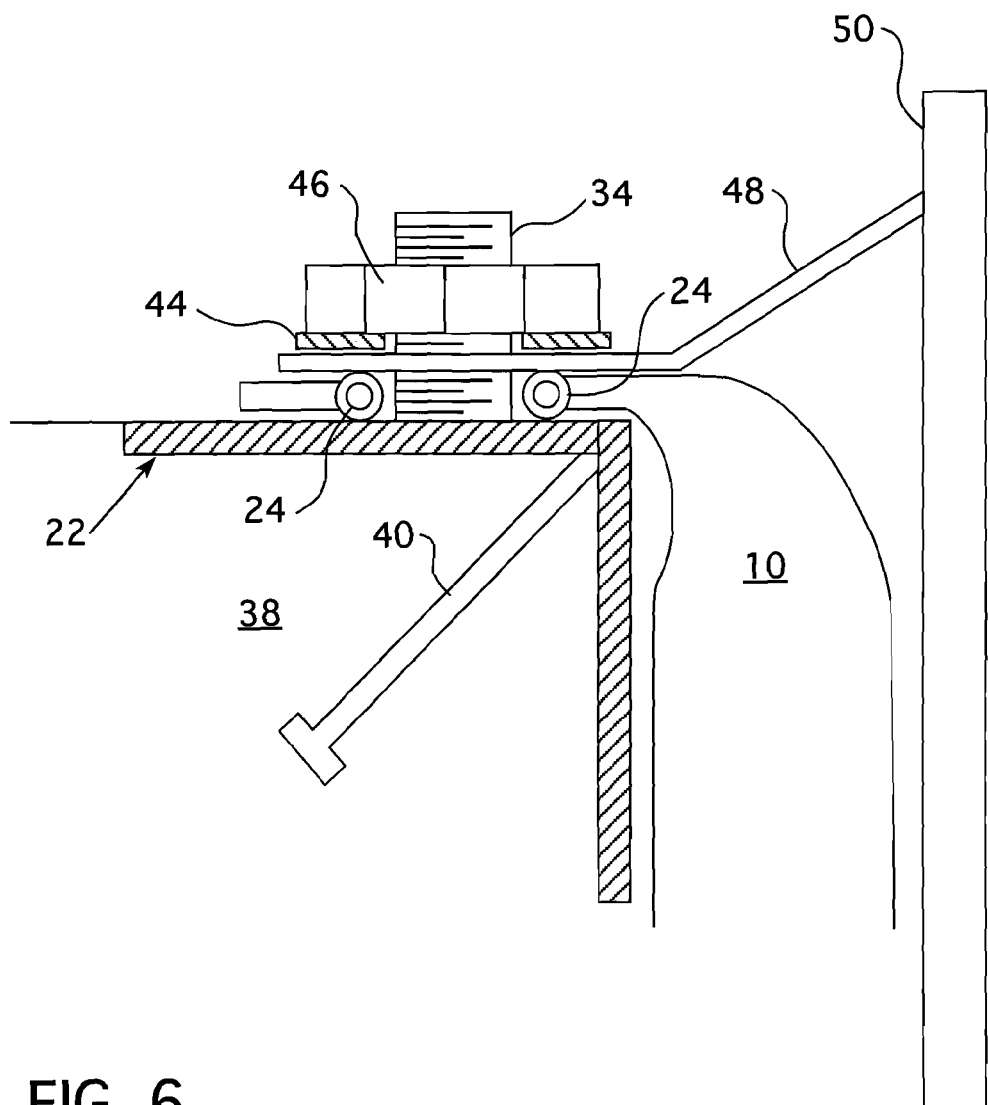
FIG. 6 is a side view, partially in section, of the concrete shield that surrounds the fuel transfer tube and the adjacent containment wall, with the flexible radiation shields of this invention disposed therebetween and supported by an angle bracket anchored to the concrete transfer tube shielding by a nelson stud.

The shield is filled with an appropriate shield fluid 32 to provide the desired radiation attenuation. In most cases, the fluid will be water or borated water with an appropriate amount of ethylene glycol or other suitable anti-freeze additive. A support frame for the radiation shield 10 illustrated in FIG. 1 is shown in more detail in FIGS. 3, 4, 5 and 6. As shown in FIGS. 3 and 6, the support frame 22 preferably comprises an angle iron from which radiation shield support bolts 34 extend to create a shield support plate 36. As shown in FIGS. 3 and 6, the shield support plate 36 is affixed to the top edge of the concrete transfer tube shield 38 using nelson studs 40. Alternatively, the support plate 36 can be held in place by bolting the plate to imbedded bolts in the concrete shield 38 (not shown) at the locations of the anchor bolt holes 42 in the support plate 36. The center-to-center distance between the bladder shield support bolts 34 is such that they mate with the center-to-center spacing of the shield grommets 24. Standard washers 44 and nuts 46 fix the bladder shield 10 to the support plate 36 as illustrated in FIG. 6. Desirably, a heavy gauge rubber or flexible sheet metal dust cover 48 is attached to the support plate 36 at the bladder shield support bolts 34 to prevent the introduction of debris to the top of the shield; thus, reducing the potential for damage to the shield bladders 10. FIG. 6 shows the shield bladder 10 supported by the support frame 22 between the concrete transfer tube shielding 38 and the containment wall 50.

The general assembly of the expansion gap radial shield 10 is shown in FIGS. 7 and 8. A relatively small make-up/expansion tank 52 is connected by a fluid communication coupling 54 to the expansion gap shield 10 in order to accommodate any temperature induced volume changes and to make up any evaporative losses. If a metal tank 52 is employed, a site gauge 56 is provided to supply an immediate indication of the water level within the make-up/expansion tank 52 and, thus the integrity of the shield, to personnel in the area. The site gauge 56 is preferably open to the atmosphere to avoid a possible over pressurization and rupture of the shield bladder 10. Also, should the gap size change such that more expansion volume is required, additional and/or larger make-up tanks can be coupled/ganged to the original make-up expansion tank 52.

Thus, the invention described herein is a passive device that provides an indication of loss of shield integrity to personnel in the immediate area by observation of the water level in the make-up expansion tank. Alternatively, remote water level indication means, well known in the art, can be employed to provide an indication of the shield integrity within the control room. The invention does not require shield support welds or attachments to the containment wall and and/or local shielding at the transfer tube 58, which could require removal and reinstallation of the shielding for in-service inspection. The invention responds rapidly to seismic events and allows relative movement between the containment 50 and the transfer tube shielding 38 as compared to other shielding methods. Furthermore, the potential for damage to the transfer tube 58 during a seismic event is reduced as compared to a conventional shielding solution involving local lead brick and/or steel plate shadow shields. The invention also avoids the plant requirement for access restrictions to the areas in the vicinity of the transfer tube during fuel transfer. Such restrictions can compromise efficient personnel traffic flow patterns during outages and extend outage times. The specific materials used in this invention are selected such that the anticipated life of the invention equals that of a maximum number of fuel cycles, and preferably, the maximum design life of a nuclear power plant, i.e., 60 years. Also, the invention will withstand the radiation exposure expected to be incurred during the transfer of spent nuclear fuel, i.e., approximately $10^7$ rads, during the plant design life.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalents thereof.

What is claimed is:

1. A power generating facility having a nuclear island with a primary side of a nuclear steam supply system enclosed within a containment, the nuclear island comprising:
    a fuel transfer tube extending through the nuclear containment for transporting nuclear fuel assemblies and irradiated components from the interior of the nuclear containment to the exterior thereof;
    a solid radiation shield surrounding at least a portion of the fuel transfer tube;
    an expansion gap between the solid radiation shield and the nuclear containment for accommodating differentials in thermal expansion of the solid radiation shield and the nuclear containment; and
    a flexible radiation shield extending between and at least partially within the expansion gap that can withstand changes in a width of the expansion gap without substantially opening a hole in the expansion gap that would be unshielded, the flexible radiation shield comprising:
        a hollow flexible outer bladder supported within the containment, having an interior reservoir for containing a fluid that attenuates neutron and gamma radiation, housed at least partially within the expansion gap between the solid radiation shield and the containment, wherein the hollow flexible outer bladder with the fluid in the reservoir substantially fills an opening in the expansion gap and the hollow flexible outer bladder is configured to expand and contract with corresponding changes in a width of the expansion gap to change an overall volume of the interior reservoir; and
        an expansion tank in fluid communication with the interior reservoir and configured to receive the fluid from the reservoir when the flexible outer bladder is squeezed as the expansion gap is closed as a result of thermal expansion and supply additional fluid to the reservoir as the expansion gap expands as a result of thermal contraction.

2. The power generating facility of claim 1 wherein the expansion tank is open to the atmosphere.

3. The power generating facility of claim 1 including means for indicating a level of the fluid in the expansion tank.

4. The power generating facility of claim 3 wherein the means for indicating the level of fluid in the expansion tank is a sight gauge.

5. The power generating facility of claim 1 including means for indicating a change in the level of volume of fluid in the reservoir.

6. The power generating facility of claim 1 including a plurality of hollow flexible outer bladders that are interconnected to hermetically communicate the interior reservoirs thereof so that the fluid can flow from one bladder to the next.

7. The power generating facility of claim 6 wherein at least some of the reservoirs of the plurality of the hollow flexible outer bladders are interconnected to others of the reservoirs of the plurality of hollow flexible outer bladders with a fluid communication port.

8. The power generating facility of claim 1 wherein the hollow flexible outer bladder is formed from two plies with an inner ply chosen from a material having properties that will contain the fluid over a plurality of outages and an outer ply that is puncture and abrasion resistant.

9. The power generating facility of claim 8 wherein the inner ply is formed from a rubber or rubberized material.

10. The power generating facility of claim 8 wherein the outer ply is formed from a rubberized Kevlar® material.

11. The power generating facility of claim 10 wherein the outer ply is formed from Aero Tec Laboratories Inc. ATL-797-B.

12. The power generating facility of claim 1 wherein the hollow flexible outer bladder includes an anti-sag baffle.

13. The power generating facility of claim 12 wherein the anti-sag baffle comprises a relatively inflexible material supporting a shape of at least four sides of the outer bladder.

14. The power generating facility of claim 13 wherein the relatively inflexible material is a mesh material.

15. The power generating facility of claim 1 including a debris shield between at least a portion of the hollow flexible outer bladder and an exterior environment around the hollow flexible bladder for protecting the hollow flexible bladder from contact with debris within the containment.

* * * * *

UNITED STATES PATENT AND TRADEMARK OFFICE
CERTIFICATE OF CORRECTION

PATENT NO. : 9,466,399 B2  
APPLICATION NO. : 12/715420  
DATED : October 11, 2016  
INVENTOR(S) : James Sejvar Page 1 of 1

It is certified that error appears in the above-identified patent and that said Letters Patent is hereby corrected as shown below:

In the Specification

Column 1, after the Title and before the Cross Reference to Related Applications paragraph, insert:
--GOVERNMENT RIGHTS
This invention was made with Government support under Contract No. DE-AC03-90SF18495 awarded by the United States Department of Energy. The Government has certain rights in this invention.--

Signed and Sealed this
Twelfth Day of November, 2019

Andrei Iancu
*Director of the United States Patent and Trademark Office*